United States Patent
Matsumaru

(10) Patent No.: US 9,474,142 B2
(45) Date of Patent: Oct. 18, 2016

(54) PLASMA GENERATING APPARATUS AND ON-LIQUID MELTING METHOD

(71) Applicant: PLUSWARE CORPORATION, Chiba (JP)

(72) Inventor: Yasuyuki Matsumaru, Chiba (JP)

(73) Assignee: PLUSWARE CORPORATION, Chiba (JP)

( * ) Notice: Subject to any disclaimer, the term of this patent is extended or adjusted under 35 U.S.C. 154(b) by 0 days.

(21) Appl. No.: 15/008,513

(22) Filed: Jan. 28, 2016

(65) Prior Publication Data
US 2016/0157331 A1    Jun. 2, 2016

Related U.S. Application Data

(63) Continuation of application No. PCT/JP2015/065700, filed on May 30, 2015.

(30) Foreign Application Priority Data

Jun. 14, 2014    (JP) ................. 2014-122930

(51) Int. Cl.
| B23K 10/00 | (2006.01) |
| H05H 1/48 | (2006.01) |
| B23K 10/02 | (2006.01) |
| H05H 1/36 | (2006.01) |
| H05H 1/46 | (2006.01) |

(52) U.S. Cl.
CPC ............... *H05H 1/48* (2013.01); *B23K 10/00* (2013.01); *B23K 10/02* (2013.01); *H05H 1/36* (2013.01); *H05H 1/46* (2013.01); *H05H 2001/4667* (2013.01); *H05H 2001/4682* (2013.01)

(58) Field of Classification Search
CPC ............ H05H 1/48; H05H 1/36; H05H 1/46; H05H 2001/4667; H05H 2001/4682; B23K 10/00; B23K 10/02
USPC ............ 219/121.38, 121.36, 121.54, 121.57, 219/121.48; 315/111.51, 223, 224
See application file for complete search history.

(56) References Cited

U.S. PATENT DOCUMENTS

| 4,855,889 A | 8/1989 | Blanchot et al. | |
| 6,150,628 A * | 11/2000 | Smith | H01J 27/16 |
| | | | 156/345.28 |
| 6,855,906 B2 * | 2/2005 | Brailove | H05B 6/108 |
| | | | 156/345.48 |

(Continued)

FOREIGN PATENT DOCUMENTS

| JP | S63-181671 U | 7/1988 |
| JP | 381168 B2 | 8/2006 |

(Continued)

OTHER PUBLICATIONS

International Search Report issued in PCT/JP2015/065700, mailed on Sep. 15, 2015, with translation (4 pages).

(Continued)

*Primary Examiner* — Mark Paschall
(74) *Attorney, Agent, or Firm* — Nakanishi IP Associates, LLC

(57) ABSTRACT

A plasma generating apparatus includes: a DC power source; a toroidal core oscillation circuit including a first choke coil connected to the DC power source, a first capacitor connected to the first choke coil, and a first switching element and second choke coil connected to the first capacitor; a toroidal core resonance circuit including a third choke coil connected to the second choke coil; and a pair of electrodes connected to the third choke coil.

8 Claims, 5 Drawing Sheets

(56) References Cited

U.S. PATENT DOCUMENTS

| | | | |
|---|---|---|---|
| 6,924,455 B1 * | 8/2005 | Chen | H01J 27/16 |
| | | | 204/298.31 |
| 8,779,322 B2 * | 7/2014 | Holber | H01J 37/32174 |
| | | | 219/121.41 |
| 2003/0230938 A1 | 12/2003 | Hatano et al. | |
| 2006/0226883 A1 | 10/2006 | Hatano et al. | |
| 2011/0272386 A1 * | 11/2011 | Morrisroe | B23K 10/00 |
| | | | 219/121.52 |

FOREIGN PATENT DOCUMENTS

| | | |
|---|---|---|
| JP | 2013-252540 A1 | 12/2013 |
| WO | 2006/025626 A1 | 3/2006 |

OTHER PUBLICATIONS

Written Opinion of the International Searching Authority issued in International Application No. PCT/JP2015/065700, mailed on Sep. 15, 2015 (4 pages).

* cited by examiner

PLASMA GENERATING APPARATUS AND ON-LIQUID MELTING METHOD

CROSS-REFERENCE TO RELATED APPLICATIONS

This is a Continuation Application of PCT Application No. PCT/JP2015/065700, filed May 30, 2015.

This application is based upon and claims the benefit of priority from the Japanese Patent Application No. 2014-122930, filed Jun. 14, 2014 the entire contents of which are incorporated herein by reference.

FIELD

The present invention relates to a plasma generating apparatus and an on-liquid melting method.

BACKGROUND

Welding is a method for applying heat or pressure to a plurality of members and firmly bonding the plurality of members.

Welding includes plasma welding in which an electrode is used as one member, and a conductive material is used as the other member, and an arc plasma (hereinafter referred to as "plasma") is generated between the electrode and the conductive material for welding therebetween.

A technique for generating plasma for welding is disclosed in the following Patent Literature 1.

CITATION LIST

Patent Literature

[Patent Literature 1] Jpn. Pat. Appln. KOKAI Publication No. 2013-252540

However, plasma welding as described in the above Patent Literature 1 requires generation of plasma of a very high temperature, and requires a high voltage, i.e., power. Consequently, a problem that the size of the apparatus structure increases is caused.

In light of the problem, the present invention is intended to provide a plasma generating apparatus that can be reduced in size and having higher efficiency, and an on-liquid melting method using the plasma generating apparatus.

A plasma generating apparatus according to one aspect of the present invention which solves the above-mentioned problem comprises: a DC power source; a toroidal core oscillation circuit including a first choke coil connected to the DC power source, a first capacitor connected to the first choke coil, and a first switching element and second choke coil connected to the first capacitor; a toroidal core resonance circuit including a third choke coil connected to the second choke coil; and a pair of electrodes connected to the third choke coil.

An on-liquid melting method according to another aspect of the present invention is for welding by using a plasma generating apparatus comprising: a DC power source; a toroidal core oscillation circuit including a first choke coil connected to the DC power source, a first capacitor connected to the first choke coil, and a first switching element and second choke coil connected to the first capacitor; a toroidal core resonance circuit including a third choke coil connected to the second choke coil; and a pair of electrodes connected to the third choke coil, and immersing one electrode in a solution and bringing another electrode to a liquid surface of the solution to generate an arc between the liquid surface and the another electrode.

A power supply apparatus according to another aspect of the present invention, comprises: a DC power source; a toroidal core oscillation circuit including a first choke coil connected to the DC power source, a first capacitor connected to the first choke coil, and a first switching element and second choke coil connected to the first capacitor; a power supply circuit including a second capacitor connected to the second choke coil; and a power drawing circuit including ferrite provided to surround a lead in the power supply circuit.

As described above, the present invention can provide a plasma generating apparatus and on-liquid melting method of higher efficiency.

DETAILED DESCRIPTION

Hereinafter, an embodiment of the present invention will be described in detail with reference to the drawings. The present invention can be implemented in many different forms, and is not limited to the embodiment or specific examples described below.

(Plasma Generating Apparatus)

Figure 1:
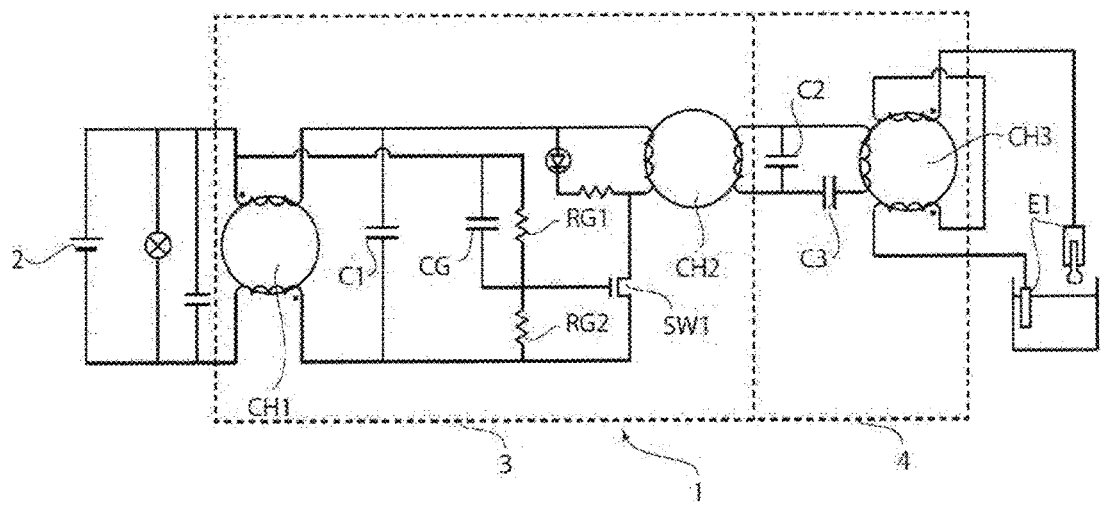
FIG. 1 shows an outline of a plasma generating apparatus according to an embodiment.

FIG. 1 shows an outline of a plasma generating apparatus (hereinafter referred to as "present apparatus") 1 according to the present embodiment. As shown in the figure, the present apparatus 1 comprises: a DC power source 2, a toroidal core oscillation circuit 3 including a first choke coil CH1 connected to the DC power source 2, a first capacitor C1 connected to the first choke coil CH1, a first switching element SW1 and second choke coil CH2 connected to the first capacitor C1; a toroidal core resonance circuit 4 including a third choke coil CH3 connected to the second choke coil CH2; and a pair of electrodes E1 connected to the third choke coil C3.

In the present embodiment, the DC power source 2 is a device which can supply a DC current or a DC voltage. The DC power source 2 includes plus and minus output terminals, each of which is connected to a lead, thereby supplying a DC current or a DC voltage to a downstream circuit part.

In the present embodiment, the DC voltage 2 is adjustable in accordance with the magnitude of the voltage or current generated between the pair of electrodes E1. To obtain a preferable output, it is desirable that the DC power source 2 can supply a DC voltage of not less than 3V and not more than 200V, preferably not less than 5V and not more than 100V, and a DC current of not less than 2 A and not less than 10 A. The DC power source 2 in the present embodiment is not limited as long as it can generate a direct current; however, an "AC-DC adapter," which receives a commercial AC current as an input and converts it into a DC current, is a preferred example.

In the present embodiment, it is also preferable that the DC power source 2 is connected to a fan F for cooling a choke coil.

Figure 2:
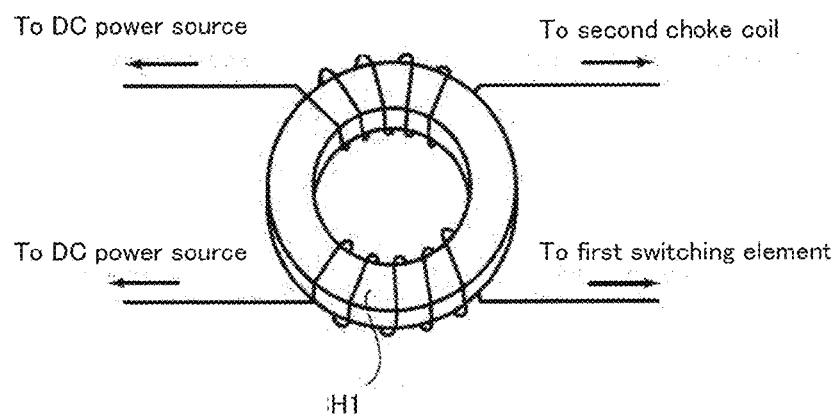
FIG. 2 is an image diagram of how a first choke coil is wound according to the embodiment.

In the present embodiment, the first choke coil CH1 is a coil having a core wound by two independent leads, and the leads are oppositely wound as shown, for example, in FIG. 2. One end of one lead is connected to the plus of the DC power source, and the other end is connected to the first capacitor C1 and the second choke coil CH2. One end of the other lead is connected to the minus of the DC power source, and the other end is connected to the first capacitor C1 and the first switching element SW1. The term "first" of the first choke coil is used for distinction from other common mode choke coils, and does not have any technically-special meaning.

In the present embodiment, the core of the first choke coil CH1 is preferably ferrite from the view point of increasing an output, but may be a mere iron core.

In the present embodiment, the inductance of the first choke coil is not limited, but is preferably not less than 0.5 mH and not more than 5.0 mH, and more preferably not less than 1.0 µH and not more than 3.0 µH.

In the present embodiment, the first capacitor C1 is connected to the first choke coil, as described above. More specifically, one terminal of the first capacitor C1 is connected to one end of one lead of the first choke coil and the second choke coil CH2, and the other terminal is connected to one end of the other lead of the first choke coil CH1 and the first switching element SW1. The first capacitor C1, the second choke coil CH2, and the first switching element SW1 are connected in series and form a circuit constituting one cycle.

In the present embodiment, the capacity of the first capacitor C1 is not particularly limited and can be adjusted as appropriate, but is preferably not less than 0.5 µF and not more than 10 µF, and more preferably not less than 1 µF and not more than 5 µF.

In the present embodiment, the first switching element SW1 controls continuity of the lead in accordance with an input of a switching signal. The switching element is not limited as long as it has that function, but non-limiting examples of the switching element are a field-effect transistor and an IGBT. In the present embodiment, an n-type field-effect transistor is used as the switching element. The source-drain region is connected to the second choke coil CH2 and the first choke coil CH1, and the gate is connected to the plus side of the DC current 2 via a first resistance RG1 and capacitor CG connected in parallel. In addition, the gate of the switching element SW1 is connected to a lead between the first choke coil CH1 and one side of the source-drain region of the switching element SW1 (side connected to the first choke coil CH1) via a second resistance RG2.

Figure 3:
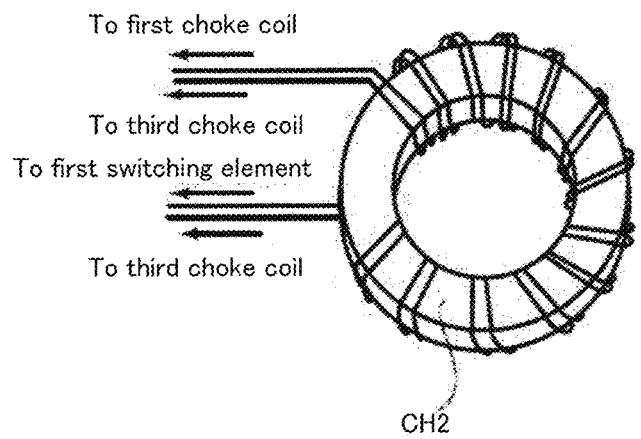
FIG. 3 is an image diagram of how a second choke coil is wound according to the embodiment.

In the present embodiment, like the first choke coil CH2, the second choke coil CH2 may include a core and a pair of leads wound around the core. However, in the present embodiment, it is preferable that the pair of leads are doubly wound in the same direction. FIG. 3 is an image diagram of this case. This configuration performs an advantage of highly efficiently transferring power. In the present embodiment, like the term "first," the term "second" is used for distinction from other common choke coils, and does not have any technically-special meaning.

In the present embodiment, the second choke coil CH2 is not limited as long as it can perform the advantage of the present apparatus, and its inductance is preferably not less than 5 µH and not more than 50 µH, and more preferably not less than 10 µH and not more than 30 µH.

As clear from the above description and drawings, one end of one lead of the second choke coil CH2 is connected to the first capacitor C1 and the first choke coil CH1, and the other end is connected to the first switching element SW1. One end of the other lead is connected to the third choke coil CH3, and the other end is also connected to the third choke coil CH3 via the third capacitor C3. A second capacitor C2 is connected between one end of the other lead and the other end of the other lead.

In the present embodiment, the core of the second choke coil is not particularly limited, but preferably includes carbonyl iron rather than ferrite.

Figure 4:
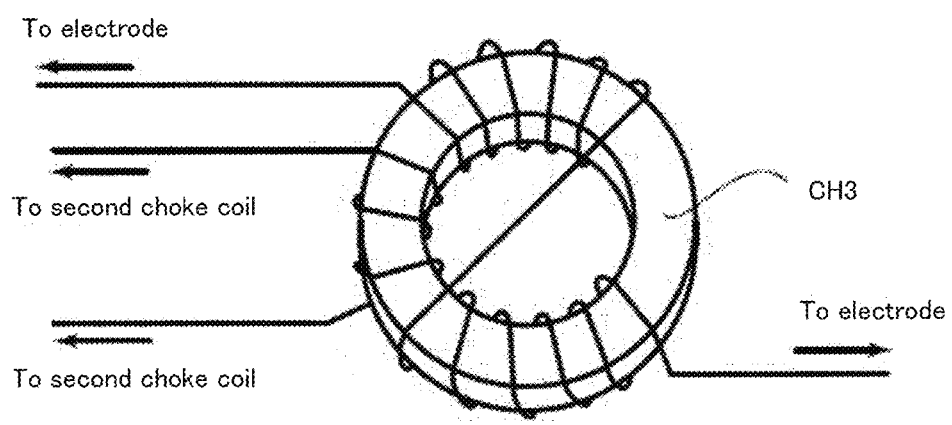
FIG. 4 is an image diagram of how a third choke coil is wound according to the embodiment.

In the present embodiment, like the above-described first choke coil, the third choke coil CH3 includes a core, and a pair of leads wound around the core in the same direction, the front end of one of the leads being connected to the tail end of the other of the leads. The lead connected to the second choke coil CH2 is wound around this third choke coil CH3. FIG. 4 is an image diagram of this case.

In the present embodiment, one end of one lead of the third choke coil CH3 is connected to the second choke coil CH2, and the other end of the lead is also connected to the second choke coil CH2, as described above. The both ends of the lead of the third choke coil CH3 are connected to the electrodes E1, respectively.

In the present embodiment, the third choke coil CH3 is not limited as long as it can perform the advantage of the present apparatus, and its inductance is preferably not less than 5 mH and not more than 40 mH, and more preferably not less than 5 mH and not more than 30 mH.

In the present embodiment, the pair of electrodes E1 are used to supply power and are connected to the third choke coil CH4.

In the present embodiment, the material of the pair of electrodes E1 may be any material having conductivity, non-limiting examples of which are gold, silver, copper and iron.

In the preset embodiment, one of the electrodes E1 preferably includes a holding portion having conductivity. This holding portion enables holding of an object to be processed, and processing of the object to be processed, which is clear from descriptions provided below.

The operating principle of the plasma generating apparatus according to the present embodiment will be described. First, power is supplied from the DC power source 2 to the first capacitor C1 via the first choke coil CH1. A fixed amount of electric charge is accumulated in the first capacitor C1. The second choke coil CH2 is supplied with power from the first capacitor C1 or the DC power source. In this case, the gate of the switching element SW1 is in the ON state because the gate is connected to the plus side of the DC power source 2. Thus, the power supplied to the second choke coil CH2 permeates through the source/drain region of the switching element SW1. However, when the second choke coil CH2 and the switching element SW1 are conducting, the voltage of the first capacitor C1 decreases and, as a result, the voltage of the first switching SW1 element decreases. Consequently, the voltage connected to the gate of the switching element SW1 decreases, and the switching element SW1 is brought into the OFF state. Then, accumulation of electric charge from the DC power source 2 in the first capacitor C1 is started again. As the sufficient quantity of electricity is reached, the gate of the switching element SW1 is brought into the ON state again, and the second capacitor C2 and the source/drain region of the switching element SW1 become conducting. By repeating this for a constant period, high frequency power can be stably supplied, and the function of the plasma generating apparatus can be performed.

Figure 5:
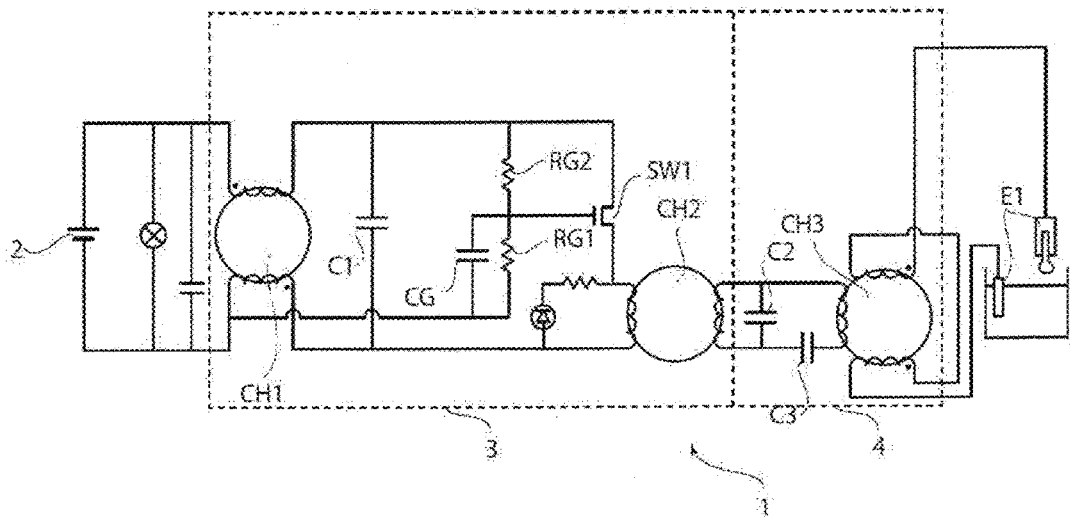
FIG. 5 shows an outline of the plasma generating apparatus according to the embodiment.

In the present embodiment, the second choke coil CH2 is connected to the plus side of the DC power source, but may be arranged on the minus side of the DC power source. This case is shown in FIG. 5. In this case, the gate of the first switching element SW1 is connected to the minus side of the DC power source, and the first switching element SW1 is a p-type field-effect transistor. The gate of the switching element SW1 is also connected to the lead connecting one side of the source/drain region (side not connected to the second choke coil) of the switching element SW1 and the first choke coil. As a result, an advantage similar to the above-described one can be performed.

With the above-described configuration, a more efficient plasma generating apparatus can be provided.

(Power Supply Apparatus)

The present apparatus can be applied to a power supply apparatus. To be more specific, in the circuit, the third choke coil is emitted, and a second capacitor is used instead. By providing ferrite around the second capacitor, the power supply apparatus can cause ferrite to generate power.

Figure 6:
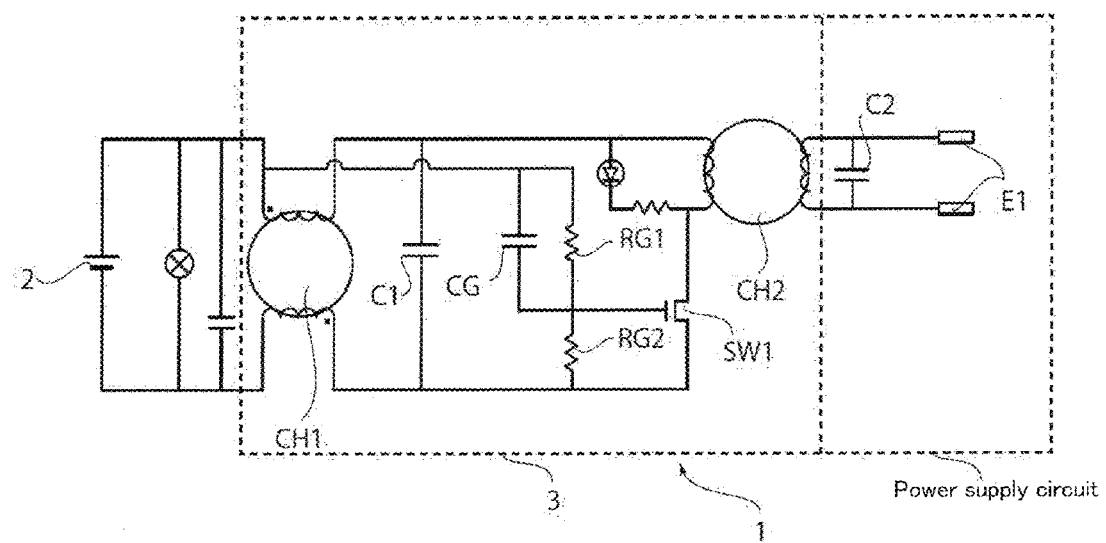
FIG. 6 shows an outline of the plasma generating apparatus according to the embodiment.
Figure 7:
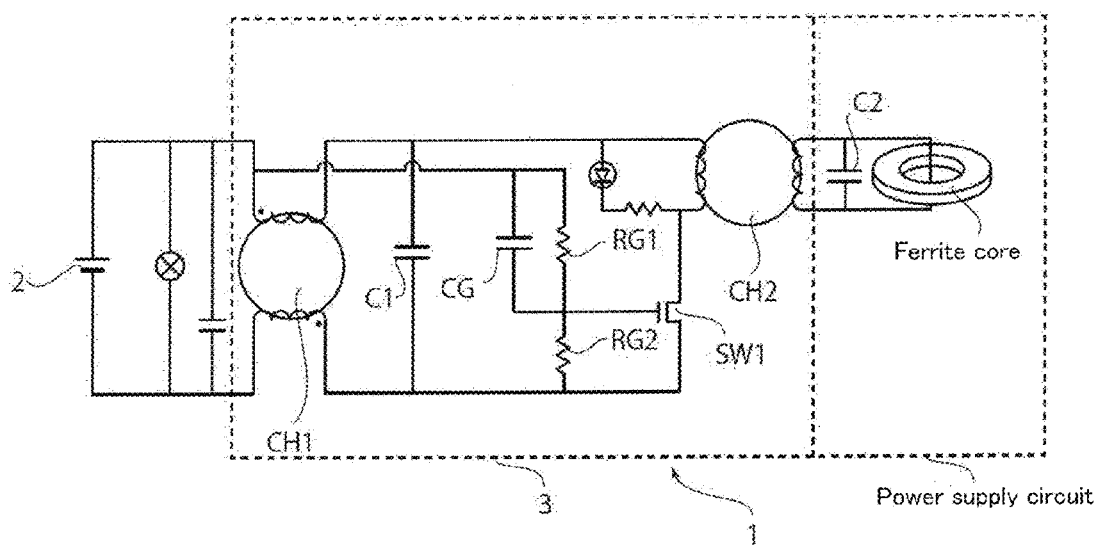
FIG. 7 shows an outline of the plasma generating apparatus according to the embodiment.

More specifically, a high-frequency power generating apparatus or a power supply apparatus as an application example of the present apparatus comprises: a DC power source 2; a toroidal core oscillation circuit 3 including a first choke coil CH1 connected to the DC power source 2, a first capacitor C1 connected to the first choke coil CH1, a first switching element SW1 and second choke coil CH2 connected to the first capacitor C1; and a power supply circuit including a second capacitor C2 and a lead connected to the second choke coil CH2, and the power supply apparatus further comprises a power drawing circuit including a ferrite core arranged to surround the lead in the power supply circuit. These apparatuses are shown in FIGS. 6 and 7.

According to the present high-frequency power generating apparatus, high-frequency power can be drawn by connecting a pair of leads. According to the present power supply apparatus, power can be transferred from the ferrite core by electromagnetic induction without having the leads contact with the ferrite core by connecting the leads and having them pass through the ferrite core.

(On-Liquid Melting Method)

An on-liquid melting method (hereinafter referred to as "present method") using the above-described plasma generating apparatus will be described. In the present method, the above-described plasma generating apparatus is used, and one electrode is immersed in a solution, whereas the other electrode is brought close to the liquid surface of the solution, thereby generating an arc between the liquid surface and the other electrode, and performing melting.

The liquid used in the present method is not particularly limited, but needs to be conductive, and is preferably water including, in particular, an electrolyte. This enables generation of an arc through a liquid.

EXAMPLES

The above-described apparatus was actually manufactured, and its advantage was confirmed. Specific descriptions will be provided below.

Figure 8:
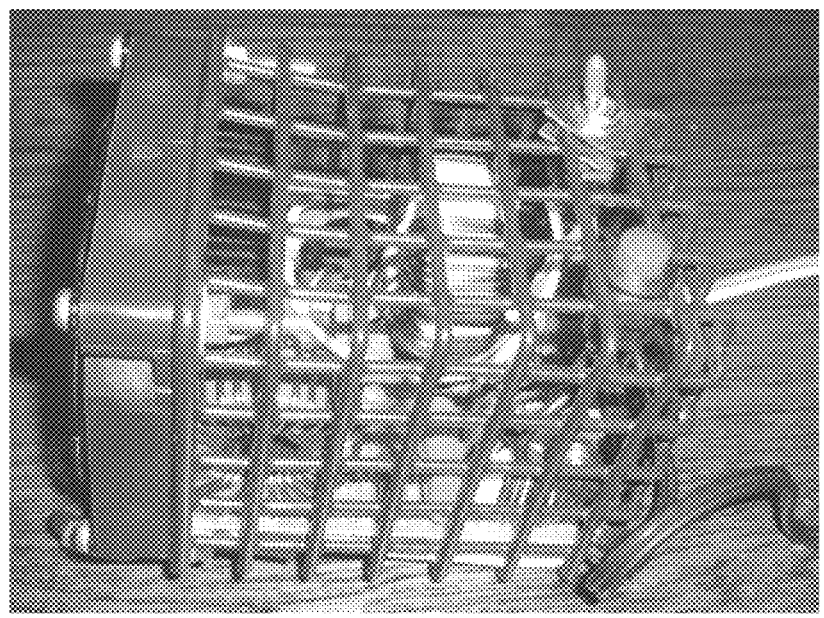
FIG. 8 is a photographic view of the plasma generating apparatus according to the embodiment.

A DC power source of 12V and 3.8 A as the DC power source, a common mode noise filter (FK130G-1020R) as the first choke coil, a film capacitor of 2.2 µF and 250V as the first capacitor, a toroidal coil HKB2-20D140-1412 of 23.7 µH as the second choke coil, an N-channel MOS-FET (2SK3628) as the switching element, and a common mode noise filter (DRC-38-S41327A) with two turns of the same leads added as the third choke coil are used and connected to form an equivalent circuit shown in FIG. 1. FIG. 8 is a photographic view of the apparatus accordingly configured.

Figure 9:
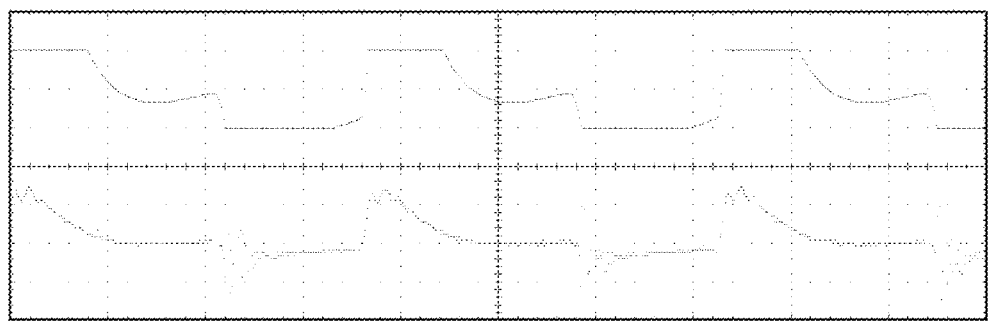
FIG. 9 shows a power waveform generated between electrodes in the plasma generating apparatus according to the embodiment.

By applying the above-described voltage and current from the DC power source to the apparatus, a high-frequency current of approximately 50 kHz and 100V was obtained. FIG. 9 shows a power waveform generated between electrodes in this case.

Figure 10:
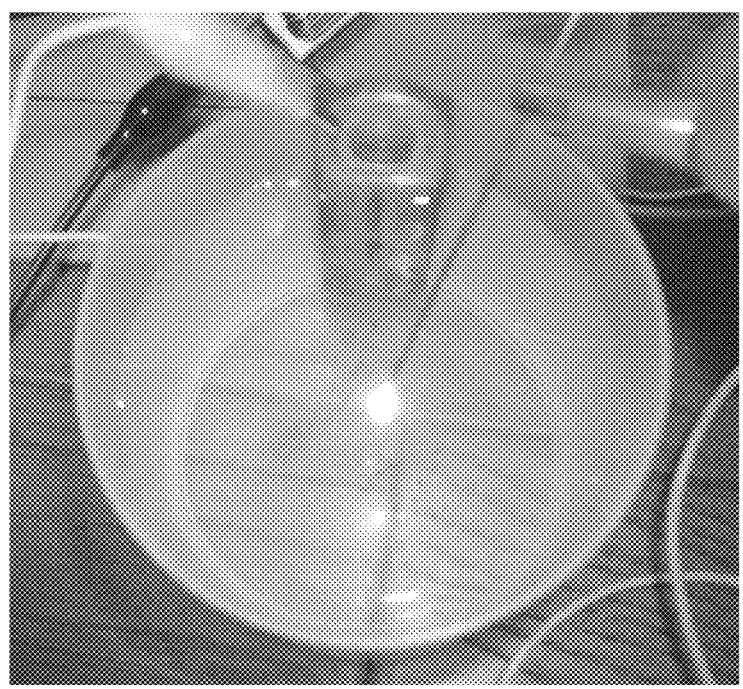
FIG. 10 is a photographic view of the case where the third choke coil copper electrode according to the present embodiment is immersed in a saline solution, and a stainless thin stick is brought close to a water surface.

A flat copper electrode was connected to one end of the third choke coil, and a stainless thin stick was connected to the other end via a conductive clip. The copper electrode was immersed in a saline solution, whereas the stainless thin stick was brought close to the water surface. Consequently, it was confirmed that an arc current was generated, and the stainless thin stick was melt. As a result, it was confirmed that sufficient welding could be achieved. FIG. 10 is a photographic view of this case.

Accordingly, it was confirmed that the present apparatus can provide a more sufficient plasma generating apparatus, and can perform plasma welding on a liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A plasma generating apparatus, comprising:
   a toroidal core oscillation circuit including:
      a first choke coil including a core wound by two independent leads, one end of one lead of the two leads being connected to a plus end of a DC power source and one end of another lead of the two leads being connected to a minus end of the DC power source;
      a first capacitor including one end connected to another end of the one lead of the first choke coil, and another end connected to another end of the another lead of the first choke coil;
      a second choke coil including a core wound by two independent leads, one end of one lead of the two leads being connected to another end of the one lead of the first choke coil; and
      a first switching element including one end connected to another end of the one lead of the second choke coil, another end connected to another end of the another lead of the first choke coil and the another end of the first capacitor, and a gate connected to a lead connecting between a plus side of the DC power source and the first choke coil; and a toroidal core resonance circuit including a code wound by two independent leads, one end of one lead of the two leads being connected one end of the another lead of the second choke coil, and another end being connected to another end of the another lead of the second choke coil; and a pair of electrodes connected to a pair of ends of another lead of the two leads of the third choke coil.

2. The plasma generating apparatus of claim 1, wherein one of the pair of electrodes includes an electrode holding portion which holds a metal and electrifies the metal.

3. An on-liquid melting method for welding by:
using the plasma generating apparatus of claim 1, and
immersing one electrode in a solution and bringing another electrode to a liquid surface of the solution to generate an arc between the liquid surface and the another electrode.

4. A plasma generating apparatus, comprising:
a toroidal core oscillation circuit including:
a first choke coil including a core wound by two independent leads, one end of one lead of the two leads being connected to a plus end of a DC power source and one end of another lead of the two leads being connected to a minus end of the DC power source;
a first capacitor including one end connected to another end of the one lead of the first choke coil, and another end connected to another end of the another lead of the first choke coil;
a first switching element including one end connected to another end of the one lead of the first choke coil and a gate connected to a lead connecting between a minus side of the DC power source and the first choke coil; and
a second choke coil including a core wound by two independent coils, one end of one lead of the two leads being connected to another end of the first switching element, and another end of the one lead being connected to another end of the another lead of the first choke coil;
a toroidal core resonance circuit including a core wound by two independent leads, one end of one lead of the two leads being connected one end of the another lead of the second choke coil, and another end being connected to another end of the another lead of the second choke coil; and
a pair of electrodes connected to a pair of ends of another lead of the two leads of the third choke coil.

5. An on-liquid melting method for welding by:
using the plasma generating apparatus of claim 4, and
immersing one electrode in a solution and bringing another electrode to a liquid surface of the solution to generate an arc between the liquid surface and the another electrode.

6. A plasma generating apparatus, comprising:
a toroidal core oscillation circuit including:
a first choke coil including a core wound by two independent leads, one end of one lead of the two leads being connected to a plus end of a DC power source and one end of another lead of the two leads being connected to a minus end of the DC power source;

a first capacitor including one end connected to another end of the one lead of the first choke coil, and another end connected to another end of the another lead of the first choke coil;
a second choke coil including a core wound by two independent leads, one end of one lead of the two leads being connected to another end of the one lead of the first choke coil; and
a first switching element including one end connected to another end of the one lead of the second choke coil, and another end connected to another end of the another lead of the first choke coil and the another end of the first capacitor; and
a toroidal core resonance circuit including a core wound by two independent leads, one end of one lead of the two leads being connected one end of the another lead of the second choke coil, and another end being connected to another end of the another lead of the second choke coil; and
a pair of electrodes connected to a pair of ends of another lead of the two leads of the third choke coil,
wherein the plasma generating apparatus comprises a lead which connects another end of the first capacitor and between the plus side of the DC power source and the first choke coil, and includes first and second resistances connected in series, and
a lead between the first and second resistances is connected to a gate electrode of the first switching element.

7. A plasma generating apparatus, comprising:
a toroidal core oscillation circuit including:
a first choke coil including a core wound by two independent leads, one end of one lead of the two leads being connected to a plus end of a DC power source and one end of another lead of the two leads being connected to a minus end of the DC power source;
a first capacitor including one end connected to another end of the one lead of the first choke coil, and another end connected to another end of the another lead of the first choke coil;
a first switching element including one end connected to another end of the one lead of the first choke coil; and
a second choke coil including a core wound by two independent coils, one end of one lead of the two leads being connected to another end of the first switching element, and another end of the one lead being connected to another end of the another lead of the first choke coil;
a toroidal core resonance circuit including a code wound by two independent leads, one end of one lead of the two leads being connected one end of the another lead of the second choke coil, and another end being connected to another end of the another lead of the second choke coil; and
a pair of electrodes connected to a pair of ends of another lead of the two leads of the third choke coil,
wherein the plasma generating apparatus comprises a lead which connects one end of the first capacitor and between a minus side of the DC power source and the first choke coil, and includes first and second resistances connected in series, and
a lead between the first and second resistances is connected to a gate electrode of the first switching element.

8. A power supply apparatus, comprising:
a toroidal core oscillation circuit including:
- a first choke coil including a core wound by two independent leads, one end of one lead of the two leads being connected to a plus end of a DC power source and one end of another lead of the two leads being connected to a minus end of the DC power source;
- a first capacitor including one end connected to another end of the one lead of the first choke coil, and another end connected to another end of the another lead of the first choke coil;
- a second choke coil including a core wound by two independent leads, one end of one lead of the two leads being connected to another end of the one lead of the first choke coil; and
- a first switching element including one end connected to another end of the one lead of the second choke coil, another end connected to another end of the another lead of the first choke coil and the another end of the first capacitor, and a gate connected to a lead connecting between a plus side of the DC power source and the first choke coil; and a power supply circuit including a second capacitor and a lead which connects between both ends of another lead of the second choke coil; and a power drawing circuit including ferrite provided to surround the lead in the power supply circuit.

* * * * *